United States Patent
Barinov (10) Patent No.: US 10,394,535 B1
(45) Date of Patent: Aug. 27, 2019

(54) FLOATING ELEMENT SYSTEM AND METHODS FOR DYNAMICALLY ADDING FEATURES TO AN APPLICATION WITHOUT CHANGING THE DESIGN AND LAYOUT OF A GRAPHICAL USER INTERFACE OF THE APPLICATION

(71) Applicant: Igor Barinov, Tel Aviv (IL)

(72) Inventor: Igor Barinov, Tel Aviv (IL)

(*) Notice: Subject to any disclaimer, the term of this patent is extended or adjusted under 35 U.S.C. 154(b) by 153 days.

(21) Appl. No.: 14/673,239

(22) Filed: Mar. 30, 2015

Related U.S. Application Data (60) Provisional application No. 61/933,149, filed on Jan. 29, 2014.

(51) Int. Cl.
*G06F 8/38* (2018.01)
*G06F 8/34* (2018.01)

(52) U.S. Cl.
CPC . *G06F 8/38* (2013.01); *G06F 8/34* (2013.01)

(58) Field of Classification Search
CPC ..... G06F 2203/04804; G06F 17/30899; G06F 3/0482; G06F 8/38; G06F 8/34
See application file for complete search history.

(56) References Cited

U.S. PATENT DOCUMENTS

| | | | | |
|---|---|---|---|---|
| 6,028,604 | A * | 2/2000 | Matthews, III | G06F 3/0481 715/821 |
| 6,252,595 | B1 * | 6/2001 | Birmingham | G06F 3/0481 715/803 |
| 7,721,228 | B2 * | 5/2010 | Burke | G06F 17/30899 715/810 |
| 7,895,531 | B2 * | 2/2011 | Radtke | G06F 17/24 715/810 |
| 8,464,172 | B2 * | 6/2013 | Chaudhri | G06F 3/0481 715/764 |
| 2011/0246916 | A1 * | 10/2011 | Leskela | G06F 3/0488 715/765 |
| 2012/0010995 | A1 * | 1/2012 | Skirpa | G06F 3/0481 705/14.49 |
| 2013/0067035 | A1 * | 3/2013 | Amanat | G06Q 30/02 709/219 |
| 2013/0282758 | A1 * | 10/2013 | Seitz | G06F 9/5016 707/770 |
| 2014/0143688 | A1 * | 5/2014 | Hou | G06F 3/0488 715/760 |
| 2014/0325425 | A1 * | 10/2014 | Milam | G06F 3/0482 715/777 |

\* cited by examiner

*Primary Examiner* — Andrew L Tank
(74) *Attorney, Agent, or Firm* — Plager Schack, LLP; Mark H. Plager; Stephen Hallberg (57) ABSTRACT

A floating element system and methods for dynamically adding features to an application without changing the design and layout of a GUI of the application are disclosed. At least one method is implemented as a visual software development tool of a software program. In some embodiments, the method adds a floating element to the GUI of the application.

8 Claims, 7 Drawing Sheets

FLOATING ELEMENT SYSTEM AND METHODS FOR DYNAMICALLY ADDING FEATURES TO AN APPLICATION WITHOUT CHANGING THE DESIGN AND LAYOUT OF A GRAPHICAL USER INTERFACE OF THE APPLICATION

CLAIM OF BENEFIT TO PRIOR APPLICATION

This application claims benefit to U.S. Provisional Patent Application 61/933,149, entitled "METHOD FOR DYNAMICALLY ADDING FEATURES TO AN APPLICATION WITHOUT CHANGING THE DESIGN AND LAYOUT OF A GRAPHICAL USER INTERFACE OF THE APPLICATION," filed Jan. 29, 2014. The U.S. Provisional Patent Application 61/933,149 is incorporated herein by reference.

BACKGROUND

Embodiments of the invention described in this specification relate generally to systems and methods for developing software applications, and more particularly, to systems and methods for updating graphical user interfaces of software applications.

When new features are added to a graphical user interface (GUI) of a web site or a mobile application, developers of the GUI typically must change the GUI design and underlying programming code. Also, when code changes to the design occur, developers often must change the layout of the GUI to better utilize and balance free space in the layer of application. This frequently results in added expenses for development and implementation of the changes. This is problematic for software developers and others who design, encode, and implement GUIs for web sites and/or applications for mobile computing devices.

Therefore, what is needed is a way to add new functions and features to an application without changing the design of the GUI.

BRIEF DESCRIPTION

Some embodiments of the invention include a novel floating element system and methods for dynamically adding features to an application without changing the design and layout of a GUI of the application. In some embodiments, the floating element system includes a cloud-based server computing device that is accessible to connecting computing devices over a network. In some embodiments, the cloud-based server computing device includes a software application that performs at least one of the methods of the floating element system.

In at least one embodiment, a method is implemented as a visual software development tool of a software program that runs on a user computing device. When performed by the software program, the method adds a floating element to the GUI of the application. The user computing device may be one of the connecting computing devices that accesses the cloud-based server computing device in order to retrieve a set of parameters associated with the floating element that the software program dynamically adds to the GUI of the application. In some embodiments, the GUI is a web site interface displayed in a web browser. In some embodiments, the GUI is a mobile app interface displayed on a mobile device.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings, which are not necessarily drawn to scale, and which show different views of different example embodiments, and wherein:

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel floating element system and methods for dynamically adding features to an application without changing the design and layout of a GUI of the application. In some embodiments, the floating element system includes a cloud-based server computing device that is accessible to connecting computing devices over a network. In some embodiments, the cloud-based server computing device includes a software application that performs at least one of the methods of the floating element system.

In at least one embodiment, a method is implemented as a visual software development tool of a software program that runs on a user computing device. When performed by the software program, the method adds a floating element to the GUI of the application. The user computing device may be one of the connecting computing devices that accesses the cloud-based server computing device in order to retrieve a set of parameters associated with the floating element that the software program dynamically adds to the GUI of the application. In some embodiments, the GUI is a web site interface displayed in a web browser. In some embodiments, the GUI is a mobile app interface displayed on a mobile device.

In this specification, there are several descriptions of methods and processes that are performed by the floating element system and/or software running on a user computing device. However, it should be noted that for the purposes of the embodiments described in this specification, the word "method" is used interchangeably with the word "process". Methods performed by the floating element system and/or software running on a user computing device are described, therefore, by reference to several example processes that conceptually illustrate process steps for dynamically adding features to an application without changing the design and layout of the application's graphical user interface (GUI).

Figure 1:
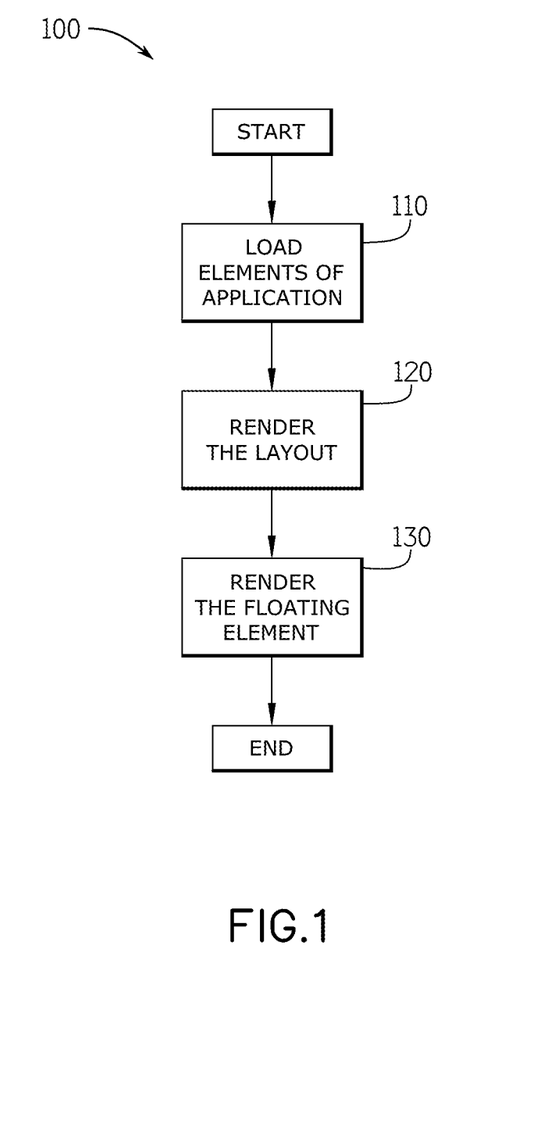
FIG. 1 conceptually illustrates a high level process for preparing a set of elements, including at least one floating element, for display in a graphical user interface (GUI) of a software application in some embodiments.

By way of example, FIG. 1 conceptually illustrates a high level process 100 for preparing a set of elements, including at least one floating element, for display in a graphical user interface (GUI) of a software application. The process 100 is performed by an application program that is running on a processor of a computing device. For example, the process 100 may be performed by a mobile app running a smartphone or a tablet computing device. As shown in this figure, the process 100 begins when a user of the computing device attempts to display an application. For example, the user may use a tablet computing device to load a website that provides a web application and a graphical user interface (GUI) that can be displayed on a display screen of the user's tablet. When such a request is made to load an application, the process 100 loads (at 110) elements of the application. For instance, several elements may be used in displaying the application, such as displayable layer elements, GUI tools and menus, and other non-displayed elements which allow the application to operate as intended.

After loading the elements of the application, the process 100 renders (at 120) the layout for display of the application on the user's computing device. In this example, where a tablet is being used by the user, the process 100 would render the layout, at least in part, based on the dimensions of the tablet display screen. After the layout is rendered, the process 100 renders (at 130) a floating element for display on the website view. In some embodiments, any floating element associated with the application are rendered after other, non-floating elements are rendered. In some embodiments, the floating element can be dynamically updated to have a different visual display, to provide a different set of information, or to provide a different set of options to the user. Because dynamic updates can be performed on-the-fly while the application is loaded, any floating item(s) are rendered after the other elements of the application, thereby allowing the rendered layout to remain loaded for the application. After rendering the floating element, the process 100 of some embodiments ends.

One of ordinary skill will realize that the process 100 described by reference to FIG. 1 is only a single high-level example of how some embodiments can dynamically add features to an application without changing the design or layout of the application.

Several more detailed embodiments are described in the sections below. Section I provides a conceptual description of the difficulty existing systems have in maintaining the design and layout of an existing application when adding features to the application and how the floating element system and associated methods overcome the problems of the existing systems to allow developers to dynamically add new features to the application without changing the design or layout of the application. Next, Section II conceptually describes two examples of processes for dynamically adding features to an application by use of one or more floating elements in the application. Section III conceptually describes a graphical user interface (GUI) of an example application in which a new feature is dynamically added to the application without changing the design or layout of the application. Section IV provides a conceptual description of an architecture of a cloud-based dynamic feature adding system that saves data related to all parameters associated with each floating element of an application. Finally, Section V describes an electronic system that implements the processes for dynamically adding features to an application by way of floating elements.

I. Adding Features to an Application

As stated above, when developers need to add new features to an application, a web site, or a mobile application (mobile "app") they have to change the design and the underlying code of the application, web site, or mobile app. However, this process of adding new functions and features frequently involves additional expenses in development and implementation. For example, an application may provide product information (or product "specs") for each product featured on a storefront website associated with the application, but even when such product information is otherwise hidden (e.g., hidden until expanded by an expansion tool element), the fundamental layout and design of the application would change whenever new, changed, and/or updated product information is added to the application.

Embodiments of the invention described in this specification solve such problems by way of a floating element system and methods for using a floating element in an application, web site, or mobile app in order to provide additional features to the application, web site, or mobile app. The floating element has virtually no cost for implementation and does not change the design because it is located in a layer that spans the visible area of the application, web site, or mobile app.

Embodiments of the floating element system and methods described in this specification differ from and improve upon the currently existing options. In particular, some embodiments of the floating element system and methods differ by using the floating element, which, as a layer on top of the mobile application or website design, it is possible to add new functions without changing the design and layout that is already present. In addition, embodiments of the floating element system and methods improve upon the currently existing options by providing the ability to add features and functionality without changing the design and layout, which in many instances has little or no free space to fit new graphical elements that access additional features. Moreover, the ability to add new features and functionality is provided by the method described in this specification without disturbing the look and feel of the design and layout which existing users of the associated website or mobile application are accustomed to seeing and using.

The floating element system and methods of the present disclosure may be implemented by a software program and/or visual software development tool of an application development system comprised of the following elements. This list of possible constituent elements is intended to be exemplary only and it is not intended that this list be used to limit the floating element system and methods of the present application to just these elements. Persons having ordinary skill in the art relevant to the present disclosure may understand there to be equivalent elements that may be substituted within the present disclosure without changing the essential function or operation of the floating element system and methods.

1. Floating element
2. Website or mobile app
3. Additional content container
4. Layer of application
5. Layer of floating button The various elements of the floating element system and methods may be related in the following exemplary fashion. It is not intended to limit the scope or nature of the relationships between the various elements and the following examples are presented as illustrative examples only. (1) a floating element is installed in a mobile application or website (2). A floating element (1) is located in the layer (5) on top of the application layer (4). When a user clicks on a floating element (1) in a mobile application or website (2) opens a window with additional content (3). Window with optional content opens in the layer (5).

The elements of the floating element system and methods described above are general details of the floating element system when running software that implements the methods for dynamically adding features to the application without changing the design or layout of the application. A person skilled in the relevant art would appreciate the many different varieties of implementations such software may take. In the next section, two processes are described for preparing a floating element for display in a GUI of a software application and for reading parameters associated with the floating element.

II. Processes for Dynamically Adding Features to an Application without Changing the Application's Design or Layout By way of example, FIG. 2 conceptually illustrates a detailed process 200 for preparing a floating element for display in a GUI of a software application. The process 200 may be performed by an application program that is running on a processor of a computing device, such as a mobile app on a smartphone or a tablet. The process 200 begins when a floating element is added to an application. For example, when a user of the computing device attempts to add a floating element to an application. In some embodiments, the process 200 initializes (at 210) the floating element with a set of local settings/parameters. For instance, the computing device of the user may include several settings related to the size and font of textual elements associated with the floating element and displayed upon selection of the floating element. As several settings/parameters of several elements may be used in displaying the application, the process 200 reads (at 220) additional settings/parameters from the network data storage by way of the cloud-based server computer. For example, different image elements may be retrieved from the network data storage via the cloud-based server so that the floating element is able to display different images based on, for example, special notifications and events, and other such things which may impact an overall display of floating elements in the application. The additional settings/parameters may also include settings/parameters of local settings. For example, cloud-based settings for a local parameter may override the local parameter in the display of the floating element.

Figure 2:
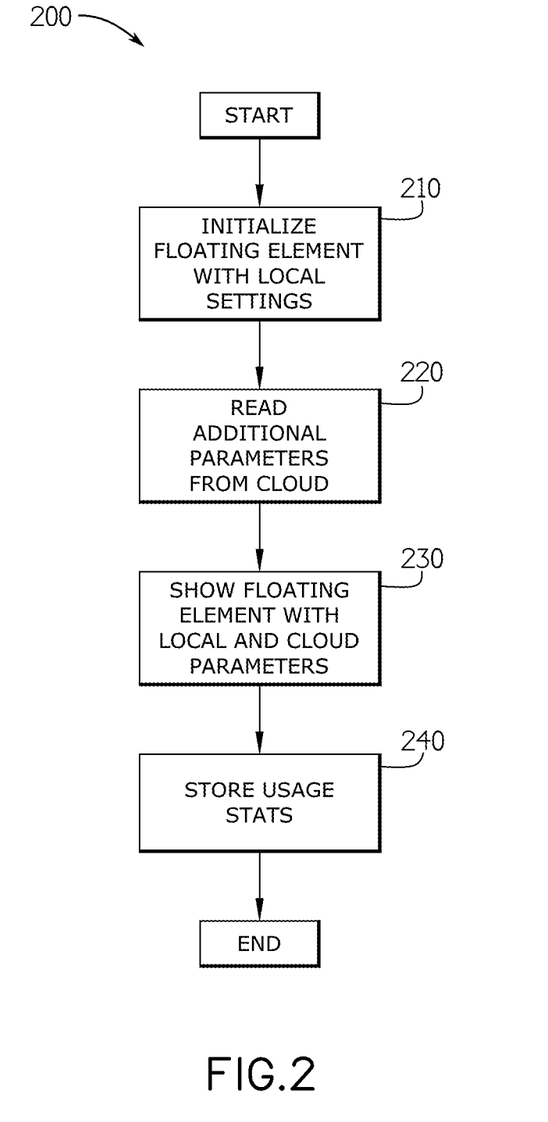
FIG. 2 conceptually illustrates a detailed process for preparing a floating element for display in a GUI of a software application in some embodiments.

Next, the process 200 shows (at 230) the floating element in a display of the application. The floating element of some embodiments is displayed with the local and cloud settings/parameters applied. Thus, the floating element can thoroughly load all settings/parameters associated with the display of the data for the floating element, and can be dynamically changed to add new features, change existing features, etc. After the process 200 displays the floating element, in some embodiments, the process 200 stores a set of usage statistics derived from use of the application elements. The process 200 then ends.

Figure 3:
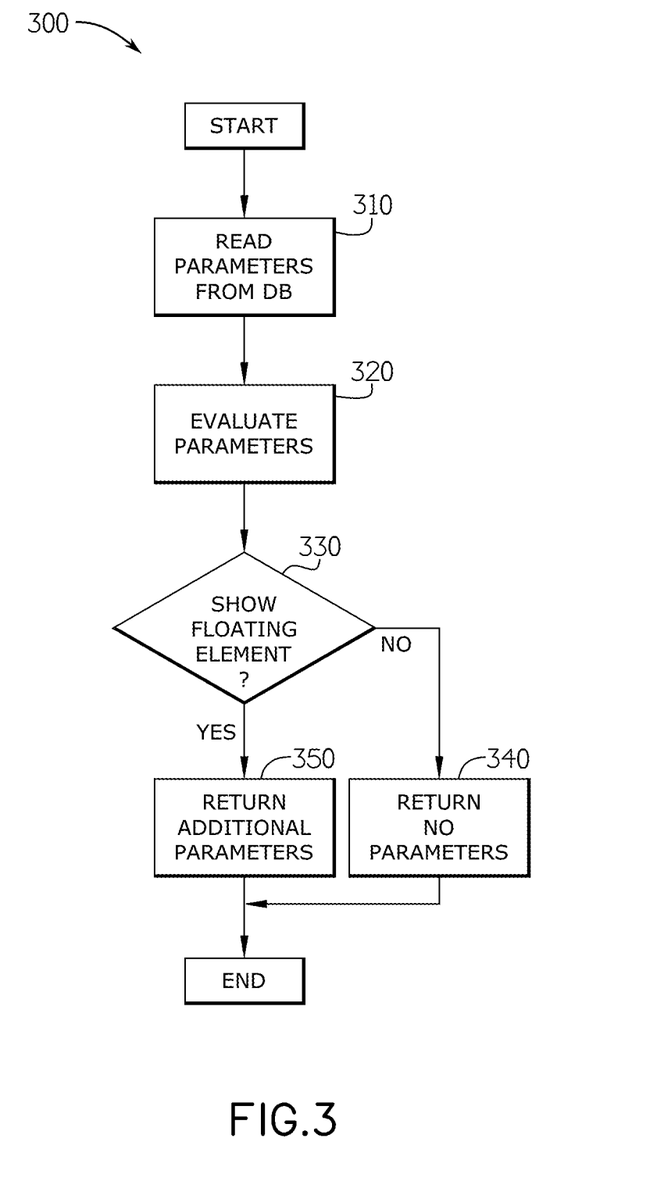
FIG. 3 conceptually illustrates a process for reading a set of floating element parameters from a network data storage in some embodiments.

In another example, FIG. 3 conceptually illustrates a process 300 for reading a set of floating element parameters from a cloud-based server and network data storage. In some embodiments, the process 300 includes a set of detailed steps involved in reading additional settings/parameters from the cloud, as described by reference to step 220 of FIG. 2.

The process 300 may start, for example, after a floating element of an application has been initialized with local settings/parameters. In some embodiments, the process 300 then reads (at 310) settings/parameters from a database deployed on the network data storage. The process 300 then evaluates (at 320) the settings/parameters read from the database.

Based on the evaluation of the settings/parameters, the process 300 of some embodiments determines (at 330) whether or not to show the floating element in the application. When the process 300 determines that the floating element should be displayed, the process 300 transitions to 350 to return/transmit the additional settings/parameters, in is further described below. On the other hand, when the process 300 determines that the floating element should not be displayed in the application, the process 300 then ends and does not return (at 340) any settings/parameters back to the connecting mobile device of the user.

Turning back to step 330, when the process 300 determines that the floating element should be displayed, the process 300 of some embodiments returns/transmits the additional settings/parameters back to the connecting mobile device of the user. The process 300 then ends.

III. Example Floating Element in an Application

The floating element system and methods of the present disclosure generally work in the context of a graphical user interface (GUI) of an application, a mobile app, and/or a website in which a developer adds a floating element to an existing product. To do this, the developer adds the code for the floating element. In some embodiments, the code the developer adds includes one or more of the local settings/parameters and/or one or more of the cloud-based settings/parameters. Depending on the status of the floating element settings/parameters, the floating element is then rendered for display in the GUI. However, instead of displaying the floating element in-line with other elements shown in the application, the floating element appears on top of the application. In this way, the floating element does not require design changes to the underlying graphical elements of the GUI for the application, the mobile app, and/or the website.

Figure 4:
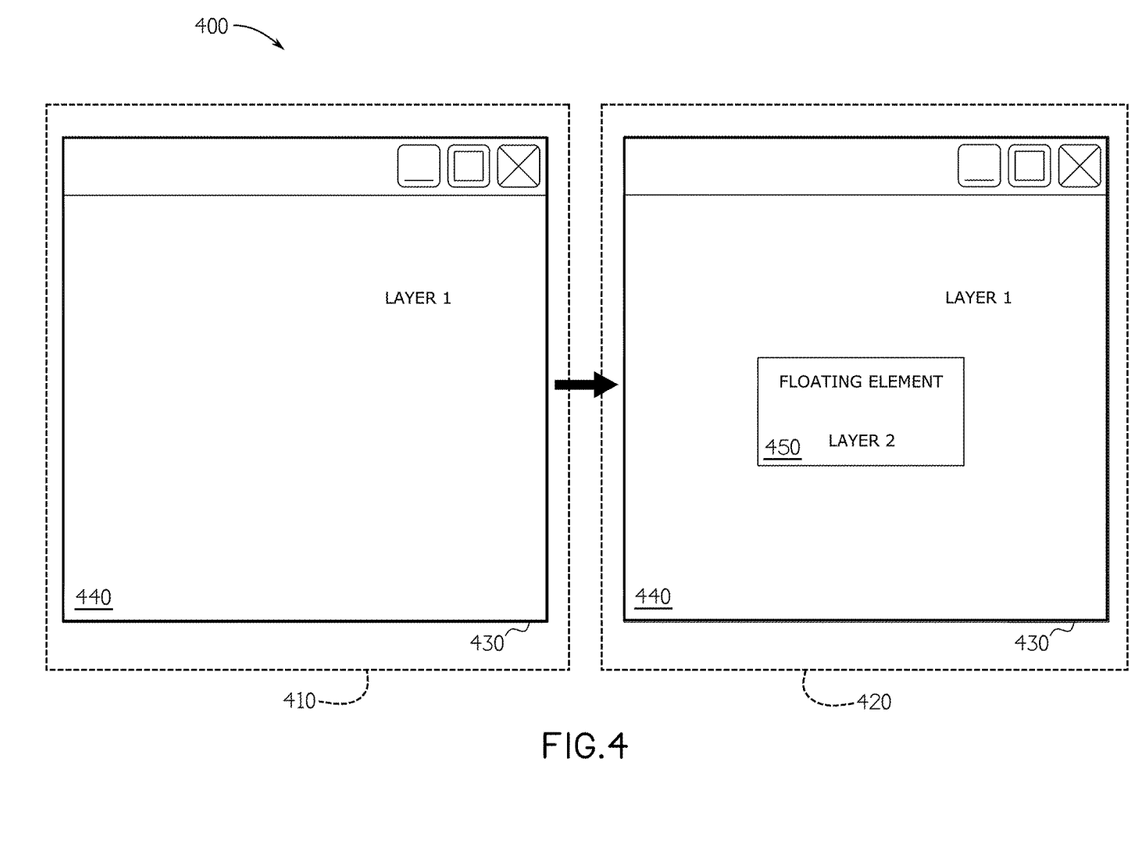
FIG. 4 conceptually illustrates an example of adding a floating element to a graphical user interface (GUI) of an application.

By way of example, FIG. 4 conceptually illustrates an example of adding a floating element to a graphical user interface (GUI) of an application. As shown in this figure, the GUI 430 of the application is shown over two stages, namely a first stage 410 and a second stage 420. During the first stage 410, the GUI 430 of the application includes a first element 440 ("LAYER 1" design and layout). During the second stage 420, the GUI 430 still includes the first element 440 ("LAYER 1" design and layout) for the application. However, the GUI 430 at the second stage 420 further includes a newly added floating element 450 ("LAYER 2" floating element). As this figure demonstrates, no changes to the design or layout of the first element 440 ("LAYER 1")

were needed in order to add the new floating element 450 ("LAYER 2") to the GUI 430 of the application.

When a user of the application, mobile app, or website interacts with the GUI 430 by, for example, using a cursor pointing device to click on the floating element 450 ("LAYER 2"), the application in which the floating element 450 is implemented opens a window to display additional content in the GUI 430 and for the user to view and/or interact with. The window that is opened can be opened anywhere in relation to the floating element layer (e.g., as noted by design that is saved in local and/or cloud settings/parameters), such that the window that is opened by selection of the floating element 450 is also located on top of the application, mobile app, or web site GUI. The content of this window may vary according to particular needs of the application, mobile app, and/or website, and may be directed by user interactions within the application, mobile app, or website. For example, the floating element of a website may vary the content displayed in the window according to different web pages of the website, such as the survey page, feedback page, advertising page, e-shopping page, and inside page of the same web site. When the user clicks on a designated area (e.g., an empty area outside of the window with optional content), the window closes. Configuration of the floating element is possible for the design, content, behavior targeting, and physics can be defined either locally or from a server.

Figure 5:
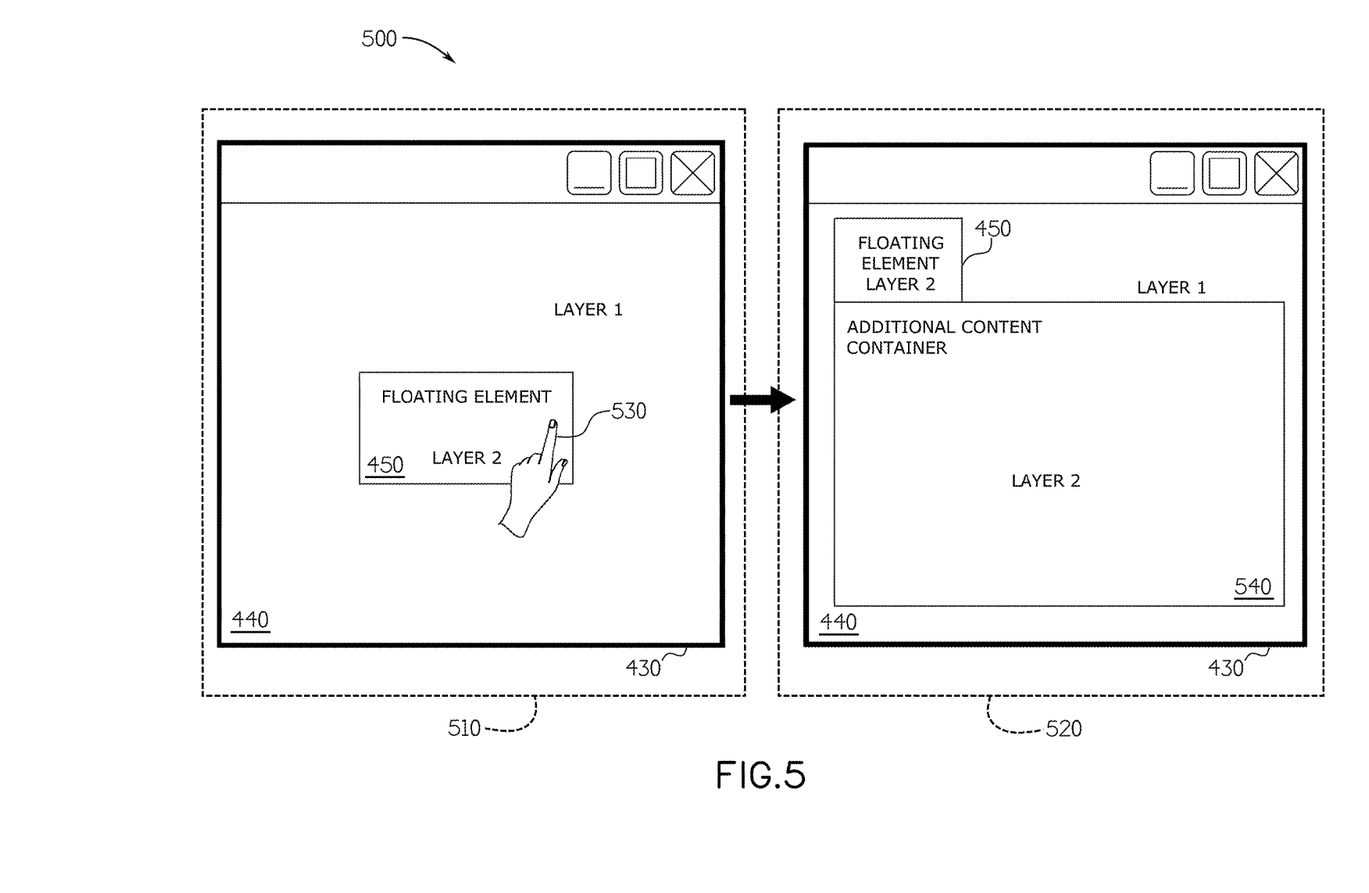
FIG. 5 conceptually illustrates an example of selecting the floating element added to the GUI of the application, as shown in FIG. 4.

By way of example, FIG. 5 conceptually illustrates an example of selecting the floating element added to the GUI of the application, as shown in FIG. 4. As shown in this figure, the GUI 430 of the application is shown over two stages, namely a first stage 510 and a second stage 520. During the first stage 510, the GUI 430 of the application includes the first element 440 ("LAYER 1" design and layout) and the floating element 450 ("LAYER 2" floating element). Also during the first stage 510, the floating element 450 is being selected by a user selection 530. During the second stage 520, the GUI 430 still includes the first element 440 ("LAYER 1" design and layout) and the floating element 450 ("LAYER 2" floating element). As a result of the user selection 530 during the first stage 510, an additional content container element 540 is also shown in the second stage 520. The additional content container element 540 is associated with the floating element 450 and is itself a floating element (i.e., "floating" above "LAYER 1" in "LAYER 2" with the floating element 450). As this figure demonstrates, no changes to the design or layout of the first element 440 ("LAYER 1") were needed in order to display the content in the additional content container element 540. Also, the additional content container element 540 can include any kind of content, such as text information, images, videos, and other such content. Furthermore, a developer can change the content in the content container element 540 at any time without affecting a change to the design or layout of the application (as demonstrated by the consistent design and layout of the first element 440 ("LAYER 1").

To make a floating element for use by the methods of the present disclosure, a user needs to write code for the floating element and the settings of the floating element. In some cases, the code must be written in a programming language suitable for the appropriate platform. For instance, the Apple iOS mobile device operating system platform in which the code may be written in Objective-C and for a web site, the code may be written in JavaScript It is possible to use a floating element in different shapes and different sizes. For example, a button with a particular size and shape versus a polygon having a different size and shape. A person skilled in the relevant art would appreciate the many design options available for implementing a floating element in an application that runs on a computing device.

To use the floating element that implements the method of the present disclosure, a user would simply click the floating element to access additional features of the mobile application or website. In this way, embodiments of the invention described in this specification solve the problem of how to add new features to a mobile application or web site without needing to implement design changes and with minimal code change for the mobile application. As the floating element is located in a layer above the visible interface layer of the mobile application or website, the method solves this problem completely.

IV. Floating Element System

Figure 6:
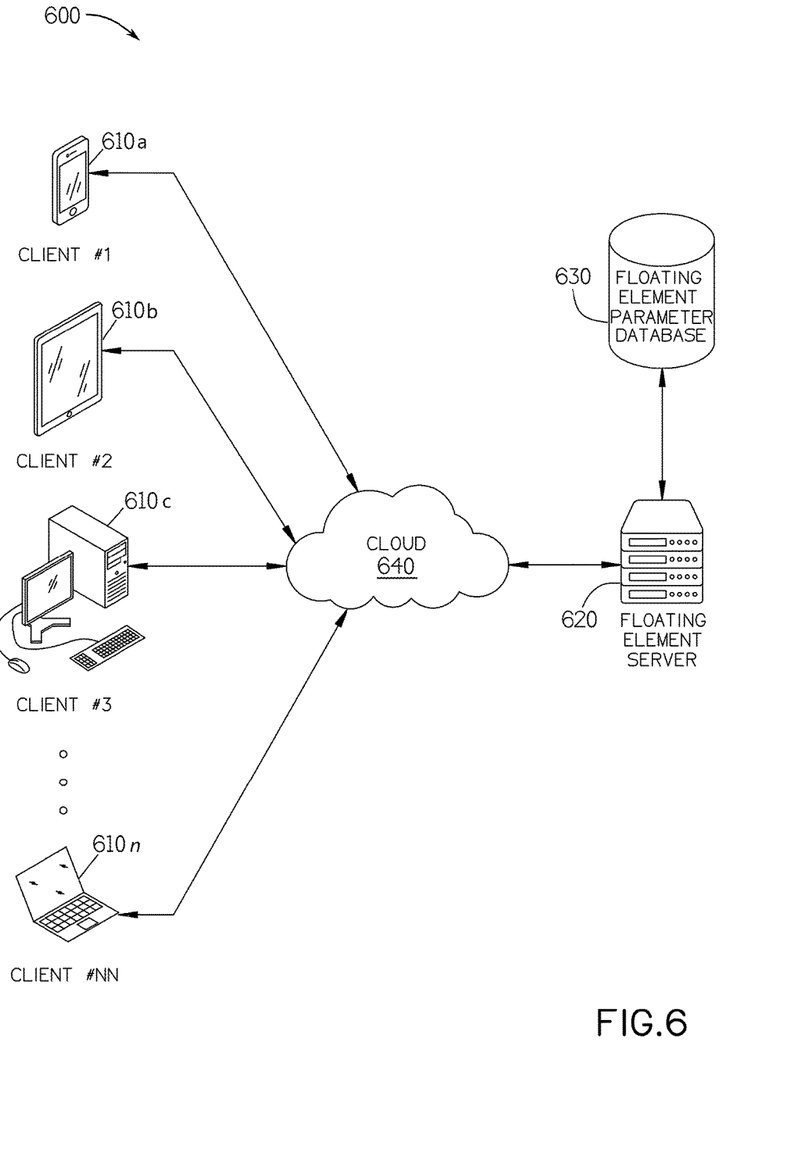
FIG. 6 conceptually illustrates a network architecture of a cloud-based floating element system in some embodiments.

By way of example, FIG. 6 conceptually illustrates a network architecture of a cloud-based floating element system 600. As shown in this figure, the floating element system 600 includes a plurality of client computing devices 610a-610n, a floating element server 620, and a floating element parameter database 630. The floating element server 620 of some embodiments is a cloud-based server accessible over the Internet. In some embodiments, the floating element server 620 provides a service for developers to dynamically add features to an application without needing to change the design or layout of the application. In some embodiments, the floating element server 620 is connected to the floating element parameter database 630. The floating element server 620 may retrieve floating element settings and parameters when requested by one or more of the client computing devices 610a-610n.

Each of the client computing devices 610a, 610b, 610c, and 610n connects to the floating element server 620 over a network (labeled "cloud" 640 in the system 600 in this figure), such as the Internet, to send floating element parameter read and retrieve requests and to receive floating element settings and parameters from the floating element parameter database 630 via the floating element server 620. In some embodiments, content data (e.g., image data, text information, video data, etc.) is stored in the floating element parameter database 630 in association with a floating element content container object.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

V. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
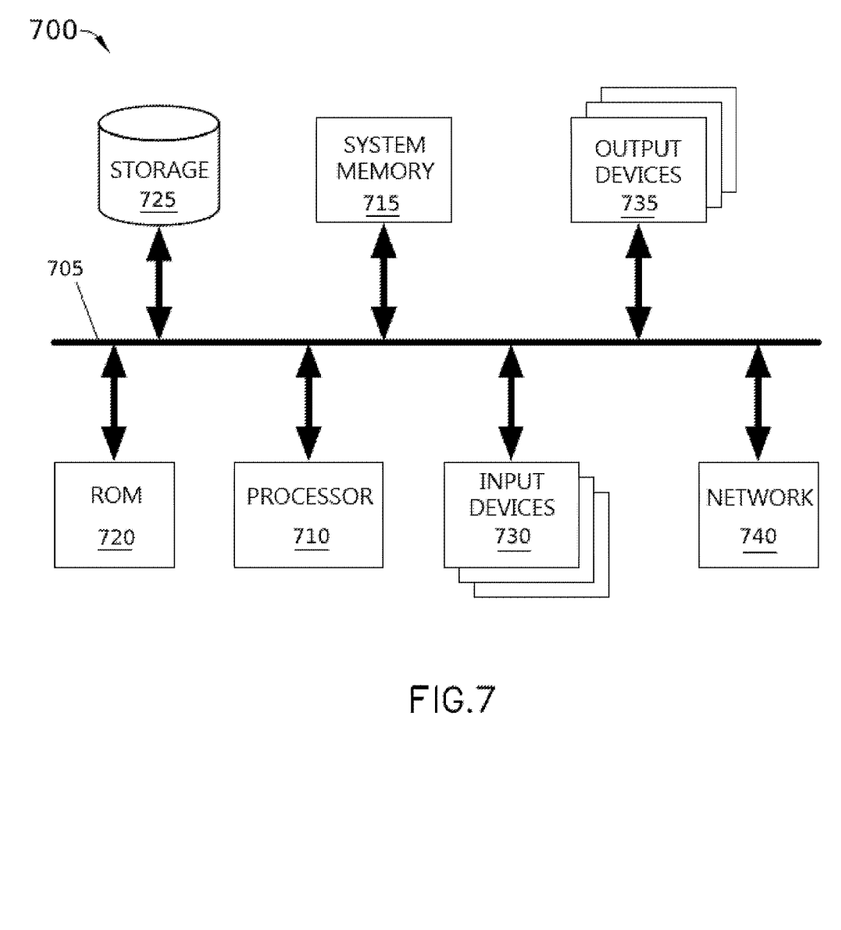
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer, phone, PDA, or any other sort of electronic device. Such an electronic system includes various types of computer readable media and interfaces for various other types of computer readable media. Electronic system 700 includes a bus 705, processing unit(s) 710, a system memory 715, a read-only 720, a permanent storage device 725, input devices 730, output devices 735, and a network 740.

The bus 705 collectively represents all system, peripheral, and chipset buses that communicatively connect the numerous internal devices of the electronic system 700. For instance, the bus 705 communicatively connects the processing unit(s) 710 with the read-only 720, the system memory 715, and the permanent storage device 725.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 725.

Other embodiments use a removable storage device (such as a floppy disk or a flash drive) as the permanent storage device 725. Like the permanent storage device 725, the system memory 715 is a read-and-write memory device. However, unlike storage device 725, the system memory 715 is a volatile read-and-write memory, such as a random access memory. The system memory 715 stores some of the instructions and data that the processor needs at runtime. In some embodiments, the invention's processes are stored in the system memory 715, the permanent storage device 725, and/or the read-only 720. For example, the various memory units include instructions for processing appearance alterations of displayable characters in accordance with some embodiments. From these various memory units, the processing unit(s) 710 retrieves instructions to execute and data to process in order to execute the processes of some embodiments.

The bus 705 also connects to the input and output devices 730 and 735. The input devices enable the user to communicate information and select commands to the electronic system. The input devices 730 include alphanumeric keyboards and pointing devices (also called "cursor control devices"). The output devices 735 display images generated by the electronic system 700. The output devices 735 include printers and display devices, such as cathode ray tubes (CRT) or liquid crystal displays (LCD). Some embodiments include devices such as a touchscreen that functions as both input and output devices.

Finally, as shown in FIG. 7, bus 705 also couples electronic system 700 to a network 740 through a network adapter (not shown). In this manner, the computer can be a part of a network of computers (such as a local area network ("LAN"), a wide area network ("WAN"), or an intranet), or a network of networks (such as the Internet). Any or all components of electronic system 700 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-3 conceptually illustrate processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which when executed by at least one processing unit of a computing device dynamically adds features to an application without changing the application design or the application layout, said program comprising sets of instructions for:
   providing, to a user computing device associated with a user of the application, a first set of functions of the application;
   providing, to the user computing device, a graphical user interface (GUI) of the application, said GUI comprising a first layer GUI;
   providing, to the user computing device, a first set of GUI tools in the first layer GUI, wherein the first set of functions of the application are accessible to the user of the application by way of the first set of GUI tools, wherein the first set of GUI tools includes a particular GUI tool;
   rendering the first layer GUI and the first set of GUI tools in the first layer GUI for a target display screen associated with the user computing device, wherein the first layer GUI is rendered with a tool space area and a free space area;
   visually outputting the rendered first layer GUI and the first set of GUI tools in the tool space area of the first layer GUI on the target display screen associated with the user computing device, wherein the particular GUI tool is located at a particular position in the tool space area of the first layer GUI;
   providing, to the user computing device, a transparent second layer of the application after rendering the first layer GUI and the first set of GUI tools in the tool space area of the first layer GUI;
   providing, to the user computing device, a visible floating element configured for display within a first geometric area of the transparent second layer when the application is running on the user computing device, wherein the first geometric area is configured for display at least in part over the free space area of the first layer GUI;
   initializing the visible floating element based on a set of local settings;
   retrieving a set of cloud-based parameters to use in rendering the visible floating element for the target display screen associated with the user computing device;
   rendering the transparent second layer of the application to span the top of the first layer GUI;
   rendering the initialized visible floating element based on the retrieved set of cloud-based parameters, wherein the initialized visible floating element is rendered for display within the first geometric area that is configured for display at least in part over the free space area of the first layer GUI rendered for the target display screen associated with the user computing device;
   visually outputting the visible floating element on the target display screen associated with the user computing device, wherein the visible floating element is visually output as a selectable floating element icon within the first geometric area of the transparent second layer and at least in part over the free space area of the first layer GUI without obstructing access to the first set of GUI tools in the tool space area of the first layer GUI on the target display screen of the user computing device, wherein the visible floating element provides access to a second set of functions of the application;
   visually outputting a second set of GUI tools in a window of the GUI of the application contemporaneously with receiving a selection of the selectable floating element icon by rendering the window of the GUI for display within a second geometric area that is outside of and adjacent to the first geometric area of the transparent second layer that spans the top of the first layer GUI, wherein the second set of GUI tools provides access to the second set of functions of the application from within the window of the GUI;
   receiving a user selection at a location within a third geometric area of the transparent second layer, wherein the third geometric area is an empty area of the transparent second layer that is outside of the second geometric area of the transparent second layer and is at least in part over the tool space area of the first layer GUI and which provide visibility and functional access to the first set of GUI tools of the first layer GUI of the application, wherein the location of the user selection within the third geometric area is visibly equivalent to the particular position of the particular GUI tool in the tool space area of the first layer GUI;
   removing the window of the GUI and the second set of GUI tools from display within the second geometric area of the transparent second layer in response to the user selection within the third geometric area of the transparent second layer; and
   activating the particular GUI tool in response to the user selection within the third geometric area of the transparent second layer, wherein the visible floating element remains visually output as the selectable floating element icon within the first geometric area of the transparent second layer on the target display screen of the user computing device after activating the particular GUI tool in response to the user selection.

2. The non-transitory computer readable medium of claim 1, wherein the set of instructions for retrieving the set of cloud-based parameters comprises sets of instructions for:
   reading the set of cloud-based parameters;
   evaluating the set of cloud-based parameters; and
   determining whether to visually output the selectable floating element icon.

3. The non-transitory computer readable medium of claim 2, wherein the program further comprises sets of instructions for:
   returning the set of cloud-based parameters when the selectable floating element icon is associated with a feature to dynamically add to the application; and
   returning no parameters from the set of cloud-based parameters when the selectable floating element icon is not associated with a feature to dynamically add to the application.

4. The non-transitory computer readable medium of claim 1, wherein the program further comprises a set of instructions for storing a set of usage statistics.

5. The non-transitory computer readable medium of claim 1, wherein the set of instructions for providing a visible floating element configured for display within a geometric area of the transparent second layer comprises sets of instructions for:
   loading the local settings and the cloud-based parameters into the application when the application is running on the user computing device; and
   visually outputting the selectable floating element icon in connection with the local settings and the cloud-based parameters.

6. The non-transitory computer readable medium of claim 1, wherein the transparent second layer and the visible floating element are GUI elements rendered for display of the application without requiring any change to the first layer GUI and the first set of GUI tools, wherein the transparent second layer and the visible floating element do not prevent interaction with the first layer GUI and the first set of GUI tools.

7. The non-transitory computer readable medium of claim 1, wherein the set of instructions for activating the particular GUI tool comprises sets of instructions for:
   providing a third set of GUI tools that provides access to a third set of functions in a different first layer GUI;
   rendering the different first layer GUI and the third set of GUI tools in the different first layer GUI for the target display screen associated with the user computing device, wherein the different first layer GUI is rendered for visual output to span beneath the transparent second layer of the application; and
   removing the first layer GUI from display and visually outputting the rendered different first layer GUI and the third set of GUI tools in the different first layer GUI beneath the transparent second layer of the application on the target display screen associated with the user computing device.

8. The non-transitory computer readable medium of claim 7, wherein the different first layer GUI and the third set of GUI tools in the different first layer GUI are rendered for display of the application without any change to the display of the visible floating element in the transparent second layer.

\* \* \* \* \*